US012589486B2

(12) United States Patent
Shibata et al.

(10) Patent No.: US 12,589,486 B2
(45) Date of Patent: Mar. 31, 2026

(54) ROBOT AND ROBOT-CONTROLLING METHOD

(71) Applicant: KAWASAKI JUKOGYO KABUSHIKI KAISHA, Kobe (JP)

(72) Inventors: Takeshi Shibata, Kobe (JP); Ryota Ono, Kobe (JP); Junichi Matsuoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 53 days.

(21) Appl. No.: 18/833,104

(22) PCT Filed: Dec. 7, 2022

(86) PCT No.: PCT/JP2022/045057
§ 371 (c)(1),
(2) Date: Jul. 25, 2024

(87) PCT Pub. No.: WO2023/149071
PCT Pub. Date: Aug. 10, 2023

(65) Prior Publication Data
US 2025/0108502 A1     Apr. 3, 2025

(30) Foreign Application Priority Data

Feb. 3, 2022     (JP) ................................ 2022-015927

(51) Int. Cl.
| | |
|---|---|
| *B25J 9/10* | (2006.01) |
| *B25J 9/16* | (2006.01) |
| *B25J 13/08* | (2006.01) |
| *B25J 15/00* | (2006.01) |
| *B25J 19/00* | (2006.01) |
| *B25J 21/00* | (2006.01) |

(52) U.S. Cl.
CPC ............... *B25J 9/103* (2013.01); *B25J 9/108* (2013.01); *B25J 13/08* (2013.01); *B25J 21/005* (2013.01)

(58) Field of Classification Search
CPC ... B25J 9/103; B25J 9/108; B25J 13/08; B25J 21/005; B25J 19/0054; B25J 9/10; B25J 9/1692; B25J 15/0014; H01L 21/677
See application file for complete search history.

(56) References Cited

U.S. PATENT DOCUMENTS

| | | | |
|---|---|---|---|
| 2005/0079042 A1 | 4/2005 | Maeda | |
| 2007/0020081 A1* | 1/2007 | Gilchrist | ........... H01L 21/67742 414/744.5 |
| 2011/0253953 A1 | 10/2011 | Tanaka | |

(Continued)

FOREIGN PATENT DOCUMENTS

| | | |
|---|---|---|
| JP | 3278019 B2 | 4/2002 |
| JP | 2003-170384 A | 6/2003 |

(Continued)

*Primary Examiner* — Harry Y Oh
(74) *Attorney, Agent, or Firm* — Oliff PLC

(57) ABSTRACT

A robot includes a robot arm; a drive mechanism for driving the robot arm, the drive mechanism including a gear(s) and a shaft; a temperature sensor for detecting a temperature in the robot arm; and a controller for compensating for influences of thermal expansions of the robot arm, and at least one of the gear(s) and the shaft based on a detection result of the temperature sensor.

12 Claims, 5 Drawing Sheets

(56)     References Cited

U.S. PATENT DOCUMENTS

| | | | |
|---|---|---|---|
| 2013/0071218 A1* | 3/2013 | Hosek | B25J 11/0095 |
| | | | 414/744.5 |
| 2016/0136812 A1 | 5/2016 | Hosek et al. | |
| 2017/0018446 A1 | 1/2017 | Yin et al. | |
| 2017/0274534 A1 | 9/2017 | Takahashi et al. | |
| 2022/0068683 A1* | 3/2022 | Matsumoto | H01L 21/67259 |

FOREIGN PATENT DOCUMENTS

| | | | |
|---|---|---|---|
| JP | 4650062 | B2 | 3/2011 |
| JP | 2013-154433 | A | 8/2013 |
| JP | 5264308 | B2 | 8/2013 |
| JP | 2018-523307 | A | 8/2018 |
| JP | 6398204 | B2 | 10/2018 |
| JP | 2020-167395 | A | 10/2020 |
| JP | 2022-041221 | A | 3/2022 |
| KR | 10-2021-0010331 | A | 1/2021 |
| WO | 2010/067591 | A1 | 6/2010 |

\* cited by examiner

ROBOT AND ROBOT-CONTROLLING METHOD

TECHNICAL FIELD

The present disclosure relates to a robot, and a robot-controlling method.

BACKGROUND ART

Robots including a robot arm are known in the art. Such a robot is disclosed in Japanese Patent Publication No. JP 6398204, for example.

The above Japanese Patent Publication No. JP 6398204 discloses a robot including a robot arm. In this robot, electric motors and gear reducers generate heat when the robot arm is operated. For this reason, the robot compensates for changes in lengths of links of the robot arm caused by a temperature change.

PRIOR ART

Patent Document

Patent Document 1: Japanese Patent Publication No. JP 6398204

SUMMARY OF THE INVENTION

However, because the robot disclosed in the above Japanese Patent Publication No. JP 6398204 compensates only for changes in the lengths caused by thermal expansions of the links of the robot arm caused by a temperature change is corrected, the robot does not sufficiently compensate for influences of thermal expansions of the parts other than the robot arm. In this correction, it is difficult to ensure stable positioning accuracy under the temperature change.

The present disclosure is intended to solve the above problem, and provides a robot and a robot-controlling method capable of ensuring stable positioning accuracy even under a temperature change as compared with a case in which a robot or a method compensates only for an influence of a thermal expansion of a robot arm.

A robot according to a first aspect of the present disclosure includes a robot arm; a drive mechanism for driving the robot arm, the drive mechanism including a gear(s) and a shaft; a temperature sensor for detecting a temperature in the robot arm; and a controller for compensating for influences of thermal expansions of the robot arm, and at least one of the gear(s) and the shaft based on a detection result of the temperature sensor.

In the robot according to the first aspect of the present disclosure, as discussed above, a controller for compensating for influences of thermal expansions of the robot arm, and at least one of the gear(s) and the shaft based on a detection result of the temperature sensor is provided. According to this configuration, it is possible to compensate not only for an influence of a thermal expansion of the robot arm but also for an influence of thermal expansion of at least one of the gear(s) and the shaft. Consequently, it is possible to ensure stable positioning accuracy even under a temperature change as compared with a case in which a robot compensates only for an influence of a thermal expansions of the robot arm.

A robot according to a second aspect of the present disclosure includes a robot arm; a drive mechanism for driving the robot arm, the drive mechanism including a power transmitter and a shaft; a temperature sensor for detecting a temperature in the robot arm; and a controller for compensating for influences of thermal expansions of the robot arm, and at least one of the power transmitter and the shaft based on a detection result of the temperature sensor.

In the robot according to the second aspect of the present disclosure, as discussed above, a controller for compensating for influences of thermal expansions of the robot arm, and at least one of the power transmitter and the shaft based on a detection result of the temperature sensor is provided. According to this configuration, it is possible to compensate not only for an influence of a thermal expansion of the robot arm but also for an influence of thermal expansion of at least one of the power transmitter and the shaft. Consequently, it is possible to ensure stable positioning accuracy even under a temperature change as compared with a case in which a robot compensates only for an influence of a thermal expansions of the robot arm.

A method for controlling a robot according to a third aspect of the present disclosure includes driving a robot arm by using a drive mechanism including a gear(s) and a shaft; detecting a temperature in the robot arm by using a temperature sensor; and compensating for influences of thermal expansions of the robot arm, and at least one of the gear(s) and the shaft based on a detection result of the temperature sensor.

In the method for controlling the robot according to the third aspect of the present disclosure, as discussed above, compensating for influences of thermal expansions of the robot arm, and at least one of the gear(s) and the shaft based on a detection result of the temperature sensor is provided. According to this configuration, it is possible to compensate not only for an influence of a thermal expansion of the robot arm but also for an influence of thermal expansion of at least one of the gear(s) and the shaft. Consequently, it is possible to ensure stable positioning accuracy even under a temperature change as compared with a case in which a method compensates only for an influence of a thermal expansions of the robot arm.

It is possible to ensure stable positioning accuracy even under a temperature change as compared with a case in which a robot compensates only for an influence of a thermal expansions of the robot arm.

MODES FOR CARRYING OUT THE INVENTION

Embodiments embodying the present disclosure will be described with reference to the drawings.

(Configuration of the Robot)

Figure 1:
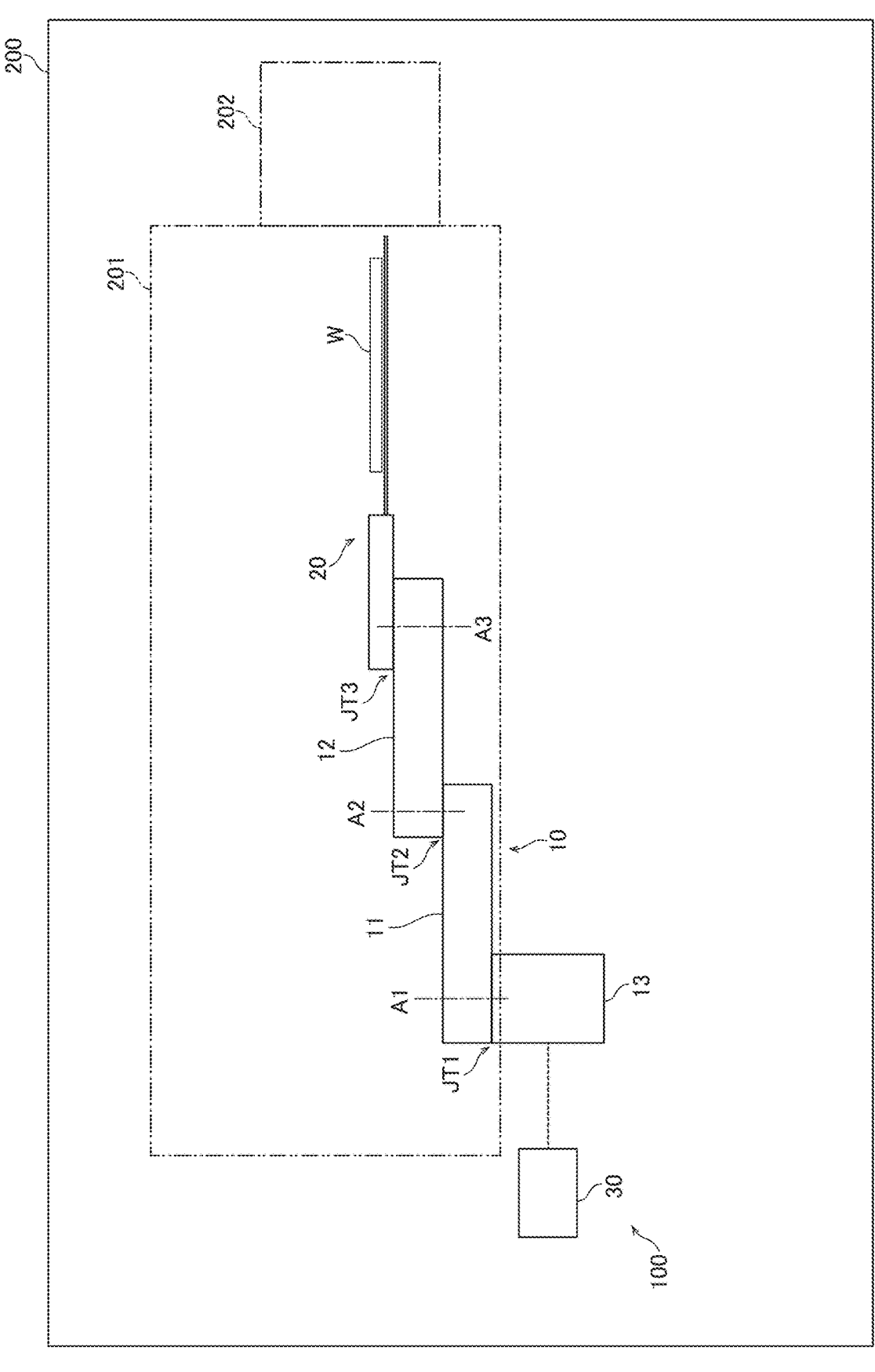
FIG. 1 is a view showing a configuration of a robot according to one embodiment.

The following description describes a configuration of a robot 100 according to one embodiment with reference to FIGS. 1 to 6. As shown in FIG. 1, the robot 100 is a substrate-conveying robot. The robot 100 is arranged in a clean room 200. Also, the robot 100 is arranged in a vacuum environment. Specifically, the robot 100 is arranged in a vacuum chamber 201.

The robot 100 includes a robot arm 10, a substrate-holding hand 20 arranged in a distal end part of the robot arm 10, and a controller 30. The substrate-holding hand 20 holds a substrate W. Specifically, the substrate-holding hand 20 is a passive hand for holding the substrate W by friction. The substrate W is a semiconductor wafer, for example. The semiconductor wafer is processed in a processing room 202.

The robot arm 10 is a horizontal multi-joint robot arm. The robot arm 10 includes a first arm part 11 and a second arm part 12. One end of the first arm part 11 is connected to a base 13 through a first joint JT1. One end of the second arm part 12 is connected to another end of the first arm part 11 through a second joint JT2. The substrate-holding hand 20 is connected to another end of the second arm part 12 through a third joint JT3.

The first joint JT1 rotates the first arm part 11 relative to the base 13 about a first rotation axis A1, which extends in an upward/downward direction. The second joint JT2 rotates the second arm part 12 relative to the first arm part 11 about a second rotation axis A2 which extends in the upward/downward direction. The third joint JT3 rotates the substrate-holding hand 20 relative to the second arm part 12 about a third rotation axis A3, which extends in the upward/downward direction.

Figure 2:
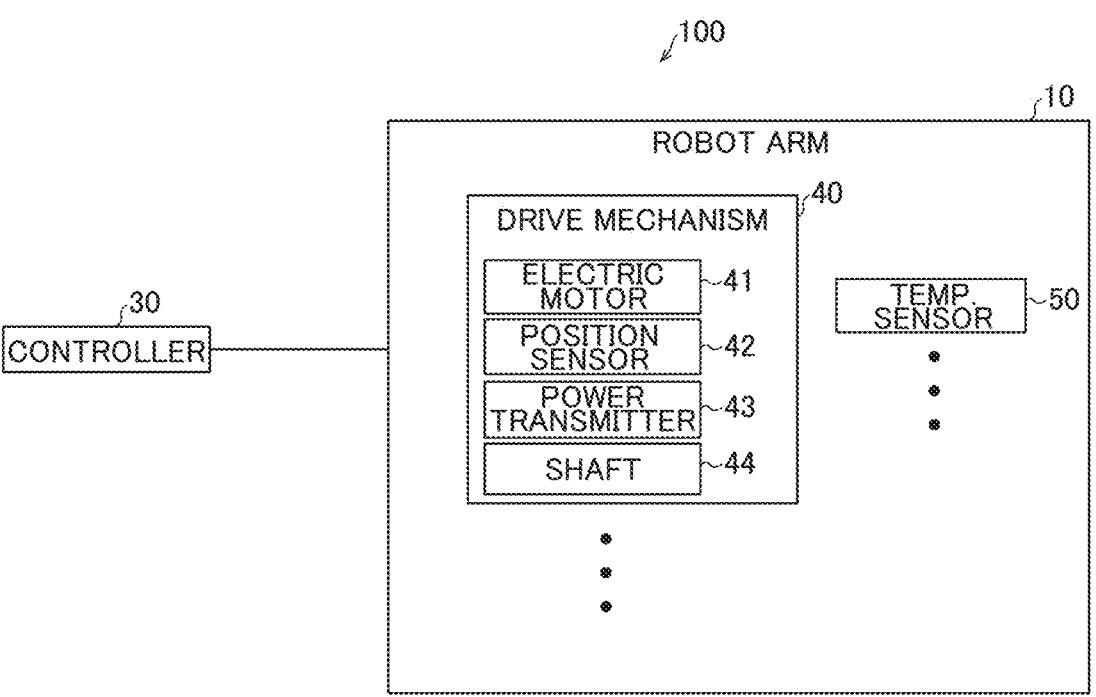
FIG. 2 is a block diagram showing the configuration of the robot according to the one embodiment.

The joints of the first joint JT1, the second joint JT2 and the third joint JT3 include drive mechanisms 40 that drive the robot arm 10 as shown in FIG. 2. The drive mechanism 40 of the first joint JT1 is arranged in the first arm part 11, the drive mechanism 40 of the second joint JT2 is arranged in the first arm part 11, and the drive mechanism 40 of the third joint JT3 is arranged in the second arm part 12. Arrangement of the drive mechanisms 40 is not limited to this.

The drive mechanism 40 includes an electric motor 41 constructed of a servo motor, a position sensor 42 for detecting a rotational position of an output shaft of the electric motor 41, a power transmitter 43 for transmitting a drive force of the electric motor 41, and a shaft 44 for rotating an object such as the first arm part 11, the second arm part 12 and the substrate-holding hand 20 in response to the drive force from the power transmitter 43.

Figure 3:
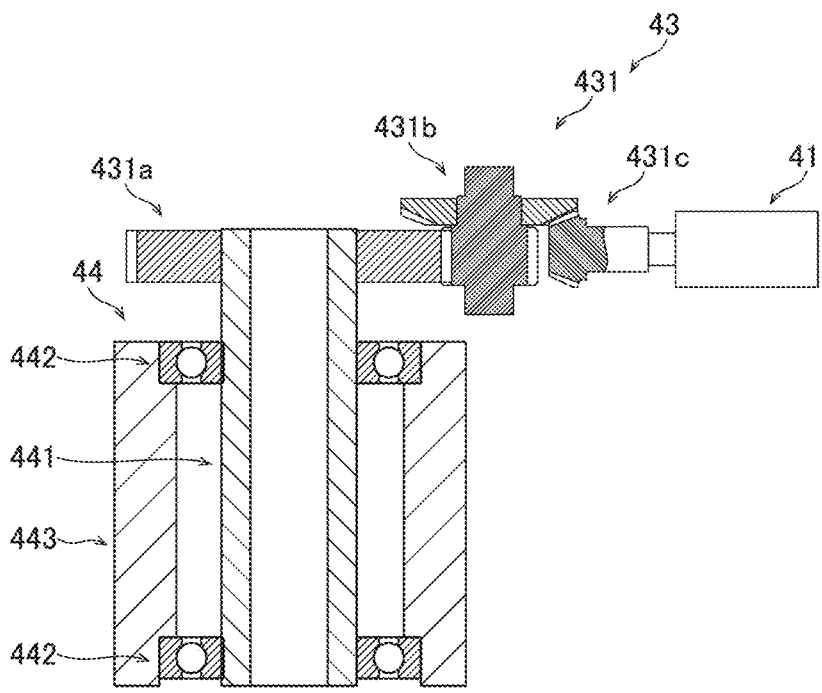
FIG. 3 is a view showing a configuration of a drive mechanism according to the one embodiment.

As shown in FIG. 3, the power transmitter 43 includes gears 431. The gears 431 includes an output gear 431a and a plurality of input gears 431b and 431c. The input gear 431c is a bevel gear that has an input side connected to the electric motor 41, and an output side connected to the input gear 431b. The input gear 431b is a bevel gear that has an input side connected to the input gear 431c, and an output side connected to the output gear 431a. The output gear 431a is a helical gear that has an input side connected to the input gear 431b, and an output side is connected to a rotation shaft 441 of the shaft 44.

The shaft 44 includes the rotation shaft 441 and bearings 442 into which the rotation shaft 441 is inserted. The rotation shaft 441 has an input side connected to the output gear 431a, and an output side connected to the objects such as the first arm part 11, the second arm part 12, and the substrate-holding hand 20. The rotation shaft 441 rotates the object. The bearings 442 rotationally support the rotation shaft 441.

The bearings 442 are attached to a housing 443, such as the first arm part 11 or the second arm part 12. The power transmitter 43 and the shaft 44 are not limited to configurations shown in FIG. 3.

Also, as shown in FIG. 2, the robot arm 10 includes temperature sensors 50 for detecting temperatures in the robot arm 10. The temperature sensors 50 are arranged in the first arm part 11 and the second arm part 12. Specifically, the temperature sensors 50 are arranged in distal and proximal end parts of the first arm part 11. In addition, the temperature sensors 50 are arranged in distal and proximal end parts of the second arm part 12. The temperature sensors 50 are thermocouples, for example. The temperature sensors 50 are arranged on interior surfaces of the first arm part 11 and the second arm part 12.

The controller 30 controls movement of the robot arm 10 by executing a predetermined program. The controller 30 controls the movement of the robot arm 10 by controlling power supplied to the electric motors 41 installed in the joints of the first joint JT1, the second joint JT2 and the third joint JT3.

When the robot arm 10 is operating, the robot arm 10 thermally expands due to heat from the electric motors 41. When the robot arm 10 thermally expands, the thermal expansion causes positional errors with respect to target positions.

Figure 4:
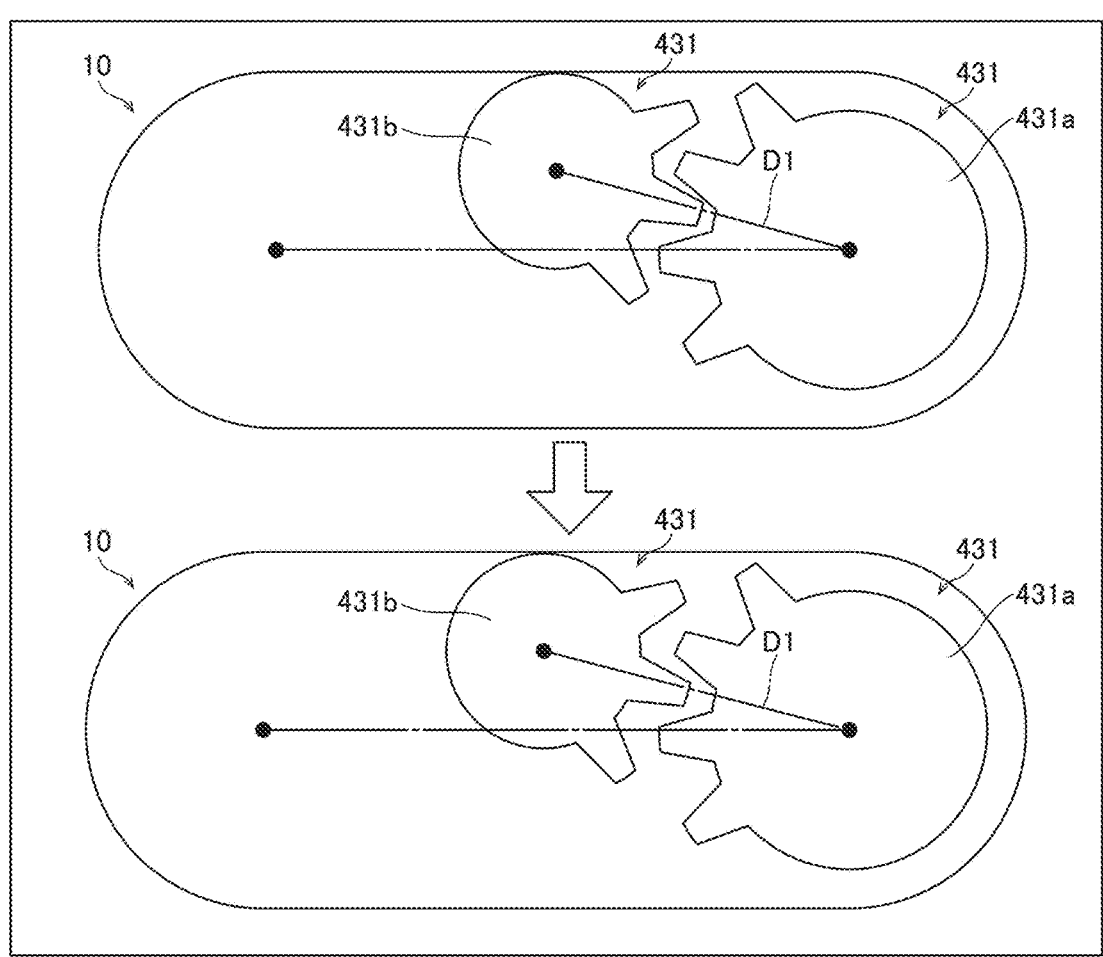
FIG. 4 is a diagram illustrating an influence of thermal expansions of a robot arm and gears.

Also, as shown in FIG. 4, when the robot arm 10 thermally expands, a distance D1 between centers of the gear 431 varies due to a difference between thermal expansions of the robot arm 10 and the gears 431 so that a backlash between the gears 431 varies. In a case in which the thermal expansion of the robot arm 10 is greater than the thermal expansions of the gears 431, the distance D1 between the centers of the gears 431 increases so that the backlash between the gears 431 increases. If the backlash between gears 431 varies, an angular error occurs due to variation of the backlash so that a positional error with respect to the target position occurs. Here, the robot arm 10, the input gear 431b, and the output gear 431a are simply illustrated for ease of illustration in FIG. 4.

Figure 5:
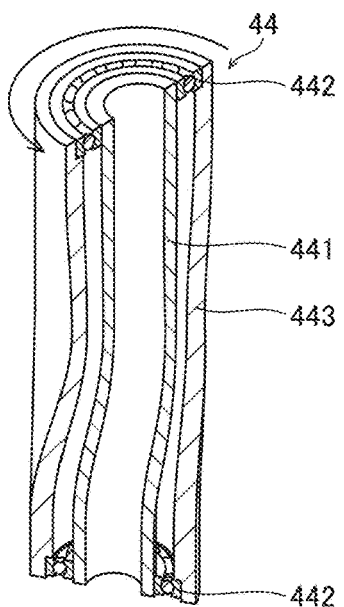
FIG. 5 is a diagram illustrating an influence of a thermal expansion of a shaft.

As shown in FIG. 5, an influence of a thermal expansion also occurs in the shaft 44. In other words, when the bearings 442 thermally expand due to heat from the electric motor 41, preloads of the bearings 442 are lost so that torsional rigidity of the shaft 44 reduces. Also, the torsional rigidity of the shaft 44 reduces due to variations of physical properties of the rotation shaft 441 and the housing 443 caused by heat. When the torsional rigidity of the shaft 44 reduces, an angular error occurs due to the reduction in the torsional rigidity of the shaft 44 so that a positional error with respect to the target position occurs.

Here, in this embodiment, the controller 30 compensates for influences of thermal expansions of the robot arm 10, the power transmitters 43 and the shafts 44 based on detection results of the temperature sensors 50. In other words, the controller 30 compensates for influences of thermal expansions of the robot arm 10, the gears 431 and the shafts 44 based on detection results of the temperature sensors 50. The controller 30 compensates for positional deviations in the robot arm 10 due to variations of lengths in the robot arm 10 caused by thermal expansions. The controller 30 compensates for a deviation amount of a rotation in the robot arm 10 due to a variation of a backlash between the gears 431 caused by thermal expansions in the robot arm 10 and reduction in torsional rigidity of the shafts 44 caused by a thermal expansion.

In this embodiment, the controller 30 compensates for the influence of a thermal expansion of a backlash between the gears 431 based on the detection results of the temperature sensors 50 and thermal expansion coefficients of the robot arm 10 and the gears 431.

In this embodiment, the robot arm 10 and the gears 431 are formed of materials having different thermal expansion coefficients. The first arm part 11 and the second arm part 12 of the robot arm 10 are formed of aluminum. The output gear 431a, and the input gears 431b and 431c in the gear 431 are formed of steel. A thermal expansion coefficient of aluminum is greater than a thermal expansion coefficient of steel. The controller 30 compensates for the influence of the thermal expansion of the backlash between the gears 431 based on the detection results of the temperature sensors 50 and a difference between thermal expansion coefficients of the robot arm 10 and the gears 431.

In this embodiment, the controller 30 compensates for the influence of the thermal expansion of the backlash between the output gear 431a and the input gear 431b that is closest to the output gear 431a side in the plurality of input gears 431b and 431c. Because an influence of a thermal expansion of a backlash between the input gears 431b and 431c is smaller than an influence of a backlash between the output gear 431a and the input gear 431b, the controller 30 does not compensate for the influence of the thermal expansion of the backlash between the input gears 431b and 431c.

In this embodiment, the controller 30 compensates for an influence of reduction in torsional rigidity of the shaft 44 due to the thermal expansion based on the detection results of the temperature sensors 50 and an operating torque of the drive mechanism 40. Compensation will be described in detail.

Compensation for positional deviation of the substrate W on the substrate-holding hand 20 is now described with reference to FIG. 6.

Figure 6:
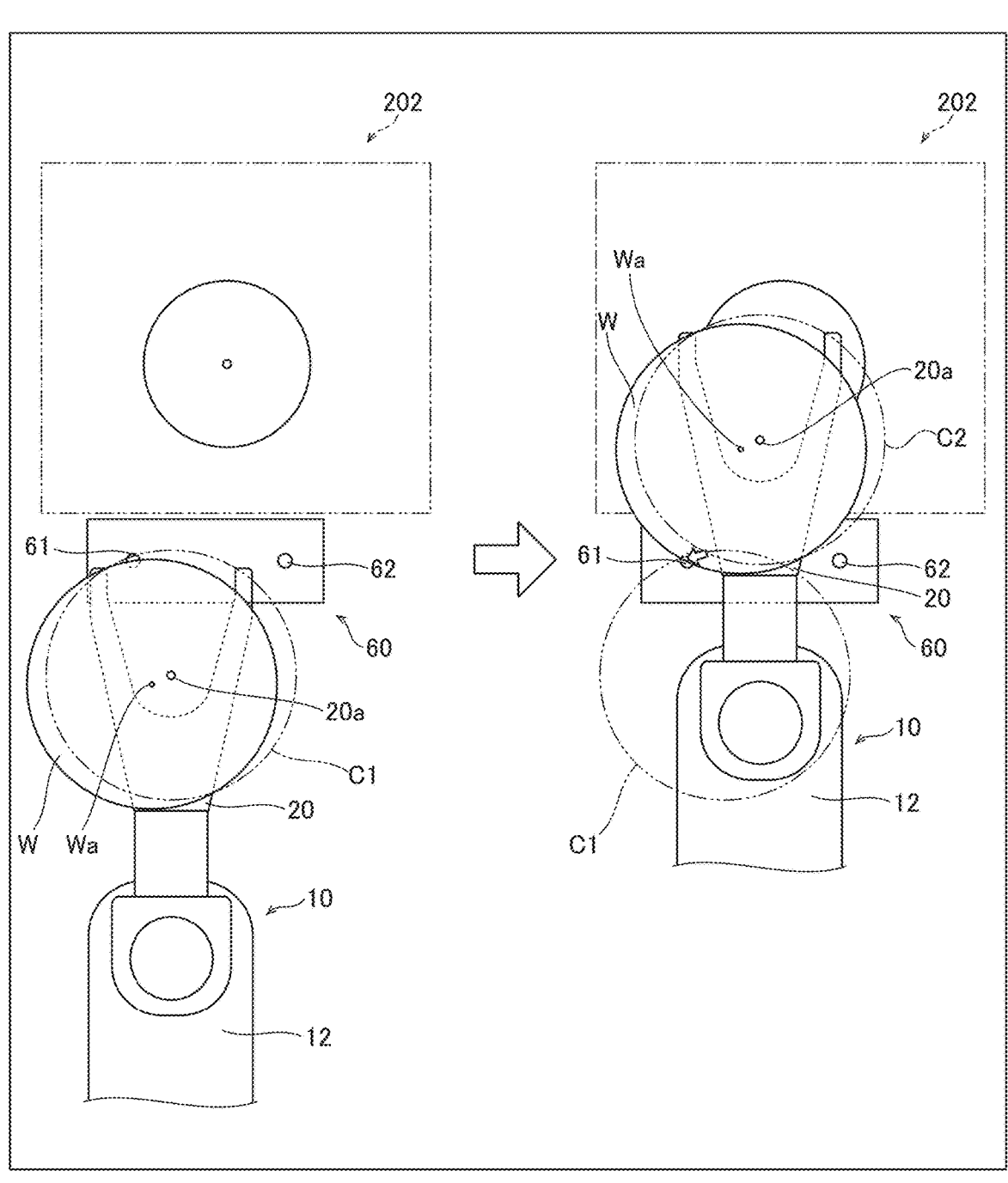
FIG. 6 is a diagram illustrating compensation of a deviation of a substrate position in the robot according to the one embodiment.

As shown in FIG. 6, a position of the substrate W on the substrate-holding hand 20 may be deviated during conveyance of the substrate, or the like. The deviation of the substrate W during conveyance of the substrate is likely to occur in a case in which the substrate-holding hand 20 is a passive hand for holding the substrate W only by friction. To address this, a positional deviation detector 60 is arranged in proximity to the processing room 202.

The positional deviation detector 60 includes a first sensor 61 and a second sensor 62. The first sensor 61 and the second sensor 62 are non-contact sensors. Reflective or transmissive sensors can be used as the first sensor 61 and the second sensor 62.

The first sensor 61 and the second sensor 62 detect passage of an outer periphery of the substrate W on the way to the processing room 202 during conveyance of the substrate W. The detection results of the first sensor 61 and the second sensor 62 are input to the controller 30. The controller 30 acquires a center position of the substrate-holding hand 20 by using the position sensor 42 of each joint when the first sensor 61 and the second sensor 62 detect the passage of the outer periphery of the substrate W, for example.

The first sensor 61 detects the passage of the outer periphery of the substrate W twice in a process in which the substrate W is conveyed along a path. The first detection is shown in a left side of FIG. 6, and the second detection is shown in a right side of FIG. 6. The controller 30 calculates the center position of the substrate-holding hand 20 when two passages are detected.

Here, imaginary circles C1 and C2 that center the two centers 20a of the substrate-holding hand 20 and have the same diameter as the substrate W are considered. The imaginary circle C1 is an imaginary circle based on the first detection, and the imaginary circle C2 is an imaginary circle based on the second detection. In the right side of FIG. 6, the imaginary circle C1 based on the first detection is drawn together with the imaginary circle C2 based on the second detection.

Although there are two intersections between the imaginary circles C1 and C2 as shown in the right side of FIG. 6, one of the two intersections that is closer to the first sensor 61 is focused. A position of this intersection can be easily calculated by a well-known geometric calculation. The controller 30 acquires a plane vector representing a deviation between the intersection focused and a position of the first sensor 61. This plane vector is indicated by a hollow arrow in the right side of FIG. 6. This deviation can be considered to be equal to a deviation of the center 20a of the substrate-holding hand 20 and the center Wa of the substrate W.

Detection of a deviation of the substrate W detected by the second sensor 62 is similar to the first sensor 61, and its description is omitted. The controller 30 acquires average values of the plane vector calculated from the detection results of the first sensor 61 and the plane vector calculated from the detection results of the second sensor 62, and compensates for a positional deviation of the substrate W on the substrate-holding hand 20 based on the average value acquired as a compensation amount for the positional deviation of the substrate W on the substrate-holding hand 20. The positional deviation of the substrate W with respect the substrate-holding hand 20 can be accurately acquired by acquiring the average values. One of the first sensor 61 and the second sensor 62 may be omitted.

Here, in a case in which the controller compensates for the positional deviation of the substrate W on the substrate-holding hand 20, a compensation amount for the positional deviation of the substrate W on the substrate-holding hand 20 includes influences of thermal expansions. For this reason, the controller 30 compensates not only for influences of thermal expansions at the target position, but also for influences of thermal expansions included in this compensation amount. The following description describes this compensation with reference to Equations.

Influences of thermal expansions in the robot arm 10 is first described. Lengths of the first arm part 11 and the second arm part 12 after thermal expansions are represented by the following Equations (1) and (2). The controller 30 can compensate for the influences of the thermal expansions in the robot arm 10 based on the following Equations (1) and (2).

[Formula 1]

$$L'_{X1} = L_{X1} + L_{X1} \times a_{A1} \left( \frac{T_{L1\,root} + T_{L1\,tip}}{2} - \frac{T_{L2\,root} + T_{L2\,tip}}{2} \right) \times 10^{-6} \quad (1)$$

$$L'_{X2} = L_{X2} + L_{X2} \times a_{A1} \left( \frac{T_{U1\,root} + T_{U1\,tip}}{2} - \frac{T_{U2\,root} + T_{U2\,tip}}{2} \right) \times 10^{-6} \quad (2)$$

where
  $L'_{X1}$ is the length of the first arm part 11 after thermal expansion [mm],
  $L'_{X2}$ is the length of the second arm part 12 after thermal expansion [mm],
  $L_{X1}$ is a length of the first arm part 11 at a reference temperature before thermal expansion [mm], $L_{X2}$ is a length of the second arm part 12 at the reference temperature before thermal expansion [mm], $a_{A1}$ is a thermal expansion coefficient of the first arm part 11 and the second arm part 12 [/$10^6$ K], $T_{L1\ root}$ is the reference temperature [° C.] at a root of the first arm part 11, $T_{L1\ tip}$ is the reference temperature [° C.] at a tip of the first arm part 11, $T_{U1\ root}$ is the reference temperature [° C.] at a root of the second arm part 12, $T_{U1\ tip}$ is the reference temperature [° C.] at a tip of the second arm part 12, $T_{L2\ root}$ is a detection temperature [° C.] of the temperature sensor 50 at the root of the first arm part 11, $T_{L2\ tip}$ is a detection temperature [° C.] of the temperature sensor 50 at the tip of the first arm part 11, $T_{U2\ root}$ is a detection temperature [° C.] of the temperature sensor 50 at the root of the second arm part 12, and $T_{U2\ tip}$ is a detection temperature [° C.] of the temperature sensor 50 at the tip of the second arm part 12.

$T_{L1\ root}$, $T_{L1\ tip}$, $T_{U1\ root}$, and $T_{U1\ tip}$ are previously determined. $T_{L2\ root}$, $T_{L2\ tip}$, $T_{U2\ root}$, and $T_{U2\ tip}$ are acquired from the temperature sensors 50 at predetermined timing, such as compensation for a positional deviation of the substrate W on the substrate-holding hand 20.

An influence of a thermal expansion of a backlash between gears 431 is now described. A variation amount of a distance between centers of the output gear 431$a$ and the input gear 431$b$ per unit temperature is represented by the following Equation (3).

[Formula 2]

$$j_{r\ JT*} = j_{JT*}(a_{Al} - a_{Fe}) \times 10^{-6} \qquad (3)$$

where $J_{r\ JT*}$ is the variation amount of the distance between the centers of the output gear 431$a$ and the input gear 431$b$ per unit temperature [mm/K] of each joint, $L_{JT*}$ is a distance between the centers of the output gear 431$a$ and the input gear 431$b$ at the reference temperature before thermal expansion [mm] of each joint, $a_{A1}$ is the thermal expansion coefficient of the first arm part 11 and the second arm part 12 [/$10^6$ K], and $a_{Fe}$ is a thermal expansion coefficient of the output gear 431$a$ and the input gear 431$b$ [/$10^6$ K].

A variation amount of a backlash between the output gear 431$a$ and the input gear 431$b$ in a normal direction per unit temperature is represented by the following Equation (4).

[Formula 3]

$$j_{n\ JT*} = 2 \times j_{r\ JT*}\sin \alpha_{JT*} \qquad (4)$$

where $J_{n\ JT*}$ is the variation amount of the backlash between the output gear 431$a$ and the input gear 431$b$ in the normal direction per unit temperature [mm/K] of each joint, $J_{r\ JT*}$ is the variation amount of the distance between the centers of the output gear 431$a$ and the input gear 431$b$ per unit temperature [mm/K] of each joint, and $\alpha_{JT*}$ is a pressure angle [deg] between the output gear 431$a$ and the input gear 431$b$ of each joint.

A variation amount of the backlash between the output gear 431$a$ and the input gear 431$b$ in a circumferential direction per unit temperature is represented by the following Equation (5).

[Formula 4]

$$j_{t\ JT*} = \frac{j_{n\ JT*}}{\cos \alpha_{JT*}\cos \beta_{JT*}} \qquad (5)$$

where $J_{t\ JT*}$ is the variation amount of the backlash between the output gear 431$a$ and the input gear 431$b$ in the circumferential direction per unit temperature [mm/K] of each joint, $J_{n\ JT*}$ is the variation amount of the backlash between the output gear 431$a$ and the input gear 431$b$ of each joint in the normal direction per unit temperature [mm/K], $\alpha_{JT*}$ is the pressure angle [deg] between the output gear 431$a$ and the input gear 431$b$ of each joint, and $\beta_{JT*}$ is a torsion angle [deg] between the output gear 431$a$ and the input gear 431$b$ of each joint.

Also, an angular variation amount of the backlash between the output gear 431$a$ and the input gear 431$b$ per unit temperature is represented by the following Equation (6).

[Formula 5]

$$j_{\theta\ JT*} = \frac{360 \times j_{n\ JT*}}{\pi d_{JT*}} \qquad (6)$$

where $J_{\theta\ JT*}$ is the angular variation amount [deg/K] of the backlash between the output gear 431$a$ and the input gear 431$b$ per unit temperature of each joint, $J_{t\ JT*}$ is the variation amount of the backlash between the output gear 431$a$ and the input gear 431$b$ in the circumferential direction per unit temperature [mm/K] of each joint, and $d_{JT*}$ is a pitch circle diameter of the output gear 431$a$ [mm] of each joint.

Also, angular variation amounts of the backlashes between the output gear 431$a$ and the input gear 431$b$ caused by their thermal expansions are represented by the following Equations (7), (8) and (9). The controller 30 can compensate for an influence of a thermal expansion of each backlash between the output gear 431$a$ and the input gear 431$b$ based on the following Equations (7), (8) and (9). In other words, the controller 30 can compensate for a deviation amount of a rotation in the robot arm 10 caused by the backlash between the output gear 431$a$ and the input gear 431$b$ by using $\theta_{B\ [JT*,***,port]}$, which represents a deviation amount of each rotation.

[Formula 6]

$$\theta_{B[JT1,*,port]} = -j_{\theta\ JT1} \times j_{d[JT1,*,port]}(T_{L1\ root} - T_{L2\ root}) \qquad (7)$$

$$\theta_{B[JT2,*,port]} = -j_{\theta\ JT2} \times j_{d[JT2,*,port]}(T_{L1\ tip} - T_{L2\ tip}) \qquad (8)$$

$$\theta_{B[JT3,*,port]} = -j_{\theta\ JT3} \times j_{d[JT3,*,port]}(T_{U1\ tip} - T_{U2\ tip}) \qquad (9)$$

where $\theta_{B\ [JT*,*,\ port]}$ is the angular variation amounts of the backlash between the output gear 431***a* and the input gear 431*b* caused by thermal expansions [deg] in each joint, $J_{\theta\ JT*}$ is the angular variation amount [deg/K] of the backlash between the output gear 431*a* and the input gear 431*b* per unit temperature of each joint, $J_{d\ [JT*,*,port]}$ is a directional influence [1 or −1] of the backlash between the output gear 431***a* and the input gear 431*b* of each joint, $T_{L1\ root}$ is the reference temperature [° C.] at a root of the first arm part 11, $T_{L1\ tip}$ is the reference temperature [° C.] at a tip of the first arm part 11, $T_{U1\ tip}$ is the reference temperature [° C.] at a tip of the second arm part 12, $T_{L2\ root}$ is a detection temperature [° C.] of the temperature sensor 50 at the root of the first arm part 11, $T_{L2\ tip}$ is a detection temperature [° C.] of the temperature sensor 50 at the tip of the first arm part 11, $T_{U2\ tip}$ is a detection temperature [° C.] of the temperature sensor 50 at the tip of the second arm part 12.

Here, * means tip, root, or teach. tip indicates that the robot arm 10 is an orientation at first detection in compensation for a compensation for a positional deviation of the substrate W on the substrate-holding hand 20. root indicates that the robot arm 10 is an orientation at second detection in compensation for a compensation for a positional deviation of the substrate W on the substrate-holding hand 20. teach means that the robot arm 10 is in an orientation at a target position, which is a teach position. Also, port indicates an access destination of the robot arm 10, such as the processing room 202. In other words, Equations (7), (8), and (9) represent calculations of the angular variation amounts of the backlash at orientations of the robot arm 10 such as tip, root and teach in a case in which the robot arm 10** accesses a predetermined access destination.

Also, $J_{d\ [JT*,***,port]}$ indicates a direction of an influence on the backlash, and can take on a value 1 or −1. $J_{d\ [JT*,***,port]}$ takes on 1 if the direction of the influence on the backlash is clockwise, and on −1 if counterclockwise, for example. $J_{d\ [JT*,*,port]}$ is determined based on port, which is the access destination of the robot arm 10, and an orientation of the robot arm 10** such as tip, root or teach.

An influence of a thermal expansion on the shaft 44 is now described. An angular variation amount caused by reduction in torsional rigidity of the shaft 44 is represented by the following Equations (10), (11) and (12). The controller 30 can compensate for an influence of a thermal expansion of the shaft 44 based on the following Equations (10), (11) and (12). In other words, the controller 30 can compensate for a deviation amount of a rotation in the robot arm 10 caused by reduction in torsional rigidity of the shaft 44 by using $\theta_{T\ [JT*,***,port]}$, which represents a deviation amount of each rotation.

[Formula 7]

$$\theta_{\tau[JT1,*,port]} = \frac{\tau_{[JT1,*,port]}}{G_{JT1}} - \frac{\tau_{[JT1,***,port]}}{G_{JT1} + \Delta G_{JT1}(T_{L1\ root} - T_{L2\ root})} \quad (10)$$

$$\theta_{\tau[JT2,*,port]} = \frac{\tau_{[JT2,*,port]}}{G_{JT2}} - \frac{\tau_{[JT2,***,port]}}{G_{JT2} + \Delta G_{JT2}(T_{L1\ tip} - T_{L2\ tip})} \quad (11)$$

-continued $$\theta_{\tau[JT3,*,port]} = \frac{\tau_{[JT3,*,port]}}{G_{JT3}} - \frac{\tau_{[JT3,***,port]}}{G_{JT3} + \Delta G_{JT3}(T_{U1\ tip} - T_{U2\ tip})} \quad (12)$$

where $\theta_{\tau\ [JT*,*,port]}$ is an angular variation amount [deg] caused by reduction in torsional rigidity of the shaft 44** of each joint, $\tau_{[JT*,*,port]}$ is an operating torque [Nm] of the drive mechanism 40** of each joint, $G_{JT*}$ is torsional rigidity [Nm/deg] at the reference temperature of the shaft 44 of each joint, $\Delta G_{JT*}$ is a variation amount of the torsional rigidity per unit temperature [Nm/(deg-K)] of the shaft 44 of each joint, $T_{L1\ root}$ is the reference temperature [° C.] at a root of the first arm part 11, $T_{L1\ tip}$ is the reference temperature [° C.] at a tip of the first arm part 11, $T_{U1\ tip}$ is the reference temperature [° C.] at a tip of the second arm part 12, $T_{L2\ root}$ is a detection temperature [° C.] of the temperature sensor 50 at the root of the first arm part 11, $T_{L2\ tip}$ is a detection temperature [° C.] of the temperature sensor 50 at the tip of the first arm part 11, $T_{U2\ tip}$ is a detection temperature [° C.] of the temperature sensor 50 at the tip of the second arm part 12.

Indications of * and port have been discussed above. In other words, Equations (10), (11), and (12) represent calculations of the angular variation amounts caused by reduction in torsional rigidity at orientations of the robot arm 10 such as tip, root and teach in a case in which the robot arm 10** accesses a predetermined access destination.

$G_{JT*}$ and $\Delta G_{JT*}$ can be obtained by experiments. For example, a worker can acquire a relation between torque and rotation angle by measuring a rotational angle of the robot arm 10 when applying a torque to the robot arm 10 with a rotation of the electric motor 41 being fixed so that the torsional rigidity of the shaft 44 can be acquired. In addition, a relation between temperature and torsional rigidity can be acquired by acquiring the torsional rigidity of the shaft 44 while changing the temperature of the robot arm 10 so that a variation amount of the torsional rigidity of the shaft 44 per unit temperature can be acquired.

The final angle including influences of thermal expansions of each joint is represented by the following Equation (13).

[Formula 8]

$$\theta_{L[JT*,***,port]} = \theta_{[JT*,***,port]} + \theta_{B[JT*,****,port]} + \theta_{\tau[JT*,***,port]} \quad (13)$$

where $\theta_{L\ [JT*,***,port]}$ is the final angle [deg] including influences of thermal expansions of each joint, $\theta_{[JT*,***,port]}$ is an angle [deg] including no influences of thermal expansions of each joint, $\theta_{B\ [JT*,*,\ port]}$ is the angular variation amounts [deg] of the backlash between the output gear 431***a* and the input gear 431*b* caused by thermal expansions in each joint, and $\theta_{\tau\ [JT*,*,port]}$ is an angular variation amount [deg] caused by reduction in torsional rigidity of the shaft 44** of each joint.

Also, compensation amounts for influences of thermal expansions in X and Y directions are represented by the following Equations (14) and (15). The controller 30 can compensate for influences of thermal expansions in the robot arm 10, of the backlash between and the output gear 431*a* and input gear 431*b*, and of the shaft 44 based on Equations (14) and (15).

[Formula 9]

$$X_{off[port]} = \frac{\left(X'_{[tip,port]} - X_{[tip,port]}\right) + \left(X'_{[root,port]} - X_{[root,port]}\right)}{2} - \left(X'_{[teach,port]} - X_{[teach,port]}\right) \tag{14}$$

$$Y_{off} = \frac{\left(Y'_{[tip,port]} - Y_{[tip,port]}\right) + \left(Y'_{[root,port]} - Y_{[root,port]}\right)}{2} - \left(Y'_{[teach,port]} - Y_{[teach,port]}\right) \tag{15}$$

where $X_{off\ [port]}$ is a compensation amount for influences of thermal expansions in the X direction, $Y_{off\ [port]}$ is a compensation amount for influences of thermal expansions in the Y direction, X is a forward transformation coordinate in the X direction based on $\theta_{[JT1,*,\ port]}$, $\theta_{[JT2,*,\ port]}$, $\theta_{[JT3,*,\ port]}$, $L_{X1}$, in $L_{X2}$ and $L_H$ (length of substrate-holding hand 20), X' is a forward transformation coordinate in the X direction based on $\theta_{L\ [JT1,*,\ port]}$, $\theta_{L\ [JT2,*,\ port]}$, $\theta_{L\ [JT3,*,port]}$, $L'_{X1}$, $L'_{X2}$ and $L_H$, Y is a forward transformation coordinate in Y direction based on $\theta_{[JT1,*,\ port]}$, $\theta_{[JT2,*,\ port]}$, $\theta_{[JT3,*,\ port]}$, $L_{X1}$, $L_{X2}$ and $L_H$, and Y' is a forward transformation coordinate in the Y direction based on $\theta_{L\ [JT1,*,\ port]}$, $\theta_{L\ [JT2,*,\ port]}$, $\theta_{L\ [JT3,*,port]}$, $L'_{X1}$, $L'_{X2}$ and $L_H$.

Here, components in $X_{off\ [port]}$ and $Y_{off\ [port]}$ that are indicated by tip and root represent the compensation amounts for the influences of thermal expansions included in compensation amounts for a positional deviation of the substrate W on the substrate-holding hand 20. Also, components in $X_{off[port]}$ and $Y_{off[port]}$ that are indicated by teach represent the compensation amounts for the influences of thermal expansions at the target position. Consequently, the controller 30 can compensate based on $X_{off\ [port]}$ and $Y_{off}$ [port] for the influences of thermal expansions at the target position and the influences of thermal expansions included in the compensation amounts for the positional deviation of the substrate W on the substrate-holding hand 20.

Also, if it is not necessary to compensate for the positional deviation of the substrate W on the substrate-holding hand 20, it is not necessary to calculate the components in $X_{off\ [port]}$ and $Y_{off\ [port]}$ that are indicated by tip and root. In this case, only the components in $X_{off\ [port]}$ and $Y_{off\ [port]}$ that are indicated by teach may be acquired, and the controller may compensate for the influences of thermal expansions at the target position. In a case in which a positional deviation of the substrate W on the substrate-holding hand 20 is not necessarily considered, such as in a case in which the substrate-holding hand 20 is a hand other than passive hand, this compensation may be used.

Figure 7:
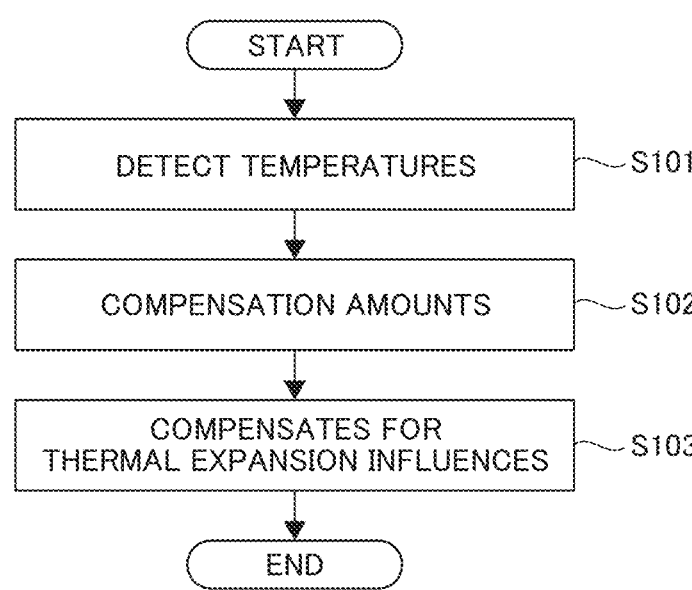
FIG. 7 is a flowchart illustrating processing of compensation of influences of thermal expansions in the robot according to the one embodiment.

Processing of compensation for influences of thermal expansions by the robot 100 according to this embodiment is described with reference to a flowchart of FIG. 7.

In step S101, the temperature sensors 50 detect temperatures in the robot arm 10, and the controller 30 acquires detection results of the temperature sensors 50. Subsequently, in step S102, compensation amounts for the influences of the thermal expansions are acquired by the controller 30 based on the detection results of the temperature sensors 50. In other words, the controller 30 acquires $X_{off}$ [port] and $Y_{off\ [port]}$ based on the aforementioned Equations (1) to (15). Subsequently, in step S103, the controller 30 compensates for the influences of the thermal expansions based on the compensation amounts for the influences of the thermal expansions. In other words, the controller 30 compensates for the influences of the thermal expansions by adding $X_{off\ [port]}$ and $Y_{off\ [port]}$ to the target position that is subjected to compensation for a positional deviation of the substrate W on the substrate-holding hand 20.

Advantages of the Embodiment

A robot 100 according to this embodiment includes a robot arm 10; a drive mechanism 40 for driving the robot arm 10, and the drive mechanism including gears 431 and a shaft 44; temperature sensors 50 for detecting temperatures in the robot arm 10; and a controller 30 for compensating for influences of thermal expansions in the robot arm 10, and for influences of thermal expansions of the gears 431 and the shaft 44 based on detection results of the temperature sensors 50 as described above.

A method for controlling a robot 100 according to this embodiment includes driving a robot arm 10 by using a drive mechanism 40 including gears 431 and a shaft 44; detecting temperature in the robot arm 10 by using temperature sensors 50; and compensating for influences of thermal expansions in the robot arm 10, and for influences of thermal expansions of the gears 431 and the shaft 44 based on detection results of the temperature sensors 50 as described above.

Accordingly, it is possible to compensate not only for influences of thermal expansions in the robot arm 10 but also for influences of thermal expansions of the gears 431 and the shaft 44. Consequently, it is possible to ensure stable positioning accuracy even under a temperature change as compared with a case in which a robot or method compensates only for influences of thermal expansions in the robot arm 10.

In this embodiment, as described above, the controller 30 compensates for a deviation amount of a rotation in the robot arm 10 due to a variation of a backlash between the gears 431 caused by thermal expansions of the gears and reduction in torsional rigidity of the shaft 44 caused by a thermal expansion of a shaft. Accordingly, stable positioning accuracy can be easily ensured even under a temperature change by compensating for a deviation amount of a rotation in the robot arm 10 even in a case in which the deviation amount of the rotation of the robot arm 10 occur due to a variation of a backlash between the gears 431 caused by thermal expansions of the gears and reduction in torsional rigidity of the shaft 44 caused by a thermal expansion of the shaft.

In this embodiment, as described above, the controller 30 compensates for the influence of a thermal expansion of a backlash between the gears 431 based on the detection results of the temperature sensors 50 and thermal expansion coefficients of the robot arm 10 and the gears 431. Accordingly, it is possible to easily compensate for an influence of the thermal expansion of the backlash between the gears 431 even in a case in which the backlash between gears 431 varies due to a different between degrees of thermal expansions of the robot arm 10 and the gears 431.

In this embodiment, as described above, the robot arm 10 and the gears 431 are formed of materials having different thermal expansion coefficients. The controller 30 compensates for an influence of the thermal expansion of the backlash between the gears 431 based on the detection results of the temperature sensors 50 and a difference between thermal expansion coefficients of the robot arm 10 and the gears 431. Accordingly, it is possible to easily compensate for the influence of the thermal expansion of the backlash between the gears 431 even in a case in which a different between degrees of thermal expansions of the robot arm 10 and the gears 431 is likely to occur due to a difference between thermal expansion coefficients of the robot arm 10 and the gears 431 so that the backlash between gears 431 is likely to vary.

Also, in this embodiment, as described above, the gears 431 includes an output gear 431a and a plurality of input gears 431b and 431c. The controller 30 compensates for the influence of the thermal expansion of the backlash between the output gear 431a and the input gear 431b that is closest to the output gear 431a side in the plurality of input gears 431b and 431c. Accordingly, it is possible to compensate for the influence of the thermal expansion of the backlash of a large variation amount between the output gear 431a and the input gear 431b, which is the closest to the output gear 431a, and consequently it is possible to effectively compensate for the influence of the thermal expansion of the backlash.

In this embodiment, as described above, the controller 30 compensates for an influence of reduction in torsional rigidity of the shaft 44 due to the thermal expansion based on the detection results of the temperature sensors 50 and an operating torque of the drive mechanism 40. Accordingly, it is possible to easily compensate for the influence of the reduction in torsional rigidity of the shaft 44 due to the thermal expansion taking into account the reduction in torsional rigidity of the shaft 44 due to temperature and deformation of the shaft 44 due to the operating torque of the drive mechanism 40.

In this embodiment, as described above, the robot 100 includes a substrate-holding hand 20 arranged in a distal end part of the robot arm 10. Accordingly, it is possible to ensure stable positioning accuracy even under a temperature change in the robot 100 that conveys substrates using the substrate-holding hand 20, which is required to have a relatively high positioning accuracy.

In this embodiment, as described above, the robot 100 is arranged in a clean room 200. As a result, it is possible to ensure stable positioning accuracy even under a temperature change in the robot 100 that is arranged in the clean room 200 to repeatedly operate many times. In other words, it is possible to ensure stable repeatability under a temperature change.

In this embodiment, as described above, the robot 100 is arranged in a vacuum environment. Accordingly, it possible to compensate for influences of thermal expansions in the robot 100 that is used in a vacuum environment in which heat is unlikely to dissipate so that temperature is likely to rise, and consequently it is possible to effectively ensure stable positioning accuracy under a temperature change.

In this embodiment, as described above, the shaft 44 includes a rotation shaft 441 and bearings 442 into which the rotation shaft 441 is inserted. Accordingly, it possible to compensate for an influence of thermal expansion of shaft 44 including the rotation shaft 441 and the bearings 442.

MODIFIED EMBODIMENTS

Note that the embodiment disclosed this time must be considered as illustrative in all points and not restrictive. The scope of the present disclosure is not shown by the above description of the embodiments but by the scope of claims for patent, and all modifications (modified embodiments) within the meaning and scope equivalent to the scope of claims for patent are further included.

While the example in which the robot arm is a horizontal multi-joint robot arm has been shown in the aforementioned embodiment, the present disclosure is not limited to this. The robot arm may be a vertical multi-joint robot.

While the example in which one substrate-holding hand is arranged in a distal end part of the robot arm has been shown in the aforementioned embodiment, the present disclosure is not limited to this. Two or more substrate-holding hands may be arranged at in a distal end part of the robot arm. Alternatively, a hand other than the substrate-holding hand may be arranged in a distal end part of the robot arm.

While the example in which the substrate-holding hand is a passive hand has been shown in the aforementioned embodiment, the present disclosure is not limited to this. The substrate-holding hand may be a hand other than the passive hand.

While the example in which the robot is arranged in a clean room has been shown in the aforementioned embodiment, the present disclosure is not limited to this. The robot may be arranged a place other than the clean room.

While the example in which the robot is a vacuum robot arranged in a vacuum environment has been shown in the aforementioned embodiment, the present disclosure is not limited to this. The robot may be an atmospheric robot arranged in an atmospheric environment.

While the example in which the controller compensates for influences of thermal expansions of the robot arm, the gears and the shaft based on detection results of the temperature sensors has been shown in the aforementioned embodiment, the present disclosure is not limited to this. The controller may compensate for influences of thermal expansions of the robot arm, and at least one of the gears and the shaft based on the detection results of the temperature sensors.

While the example in which the power transmitter is a gear power transmitter including the gears has been shown in the aforementioned embodiment, the present disclosure is not limited to this. The power transmitter may be a belt pulley power transmitter including pulleys and a belt wound around the pulleys. Also, in this case, because the belt extends due to its own thermal expansion, and the belt extends due to increase of a distance between the pulleys caused by a thermal expansion in the robot arm, it is necessary to compensate for influences of the thermal expansions. For example, the controller can compensate for the influences of thermal expansions in the belt pulley power transmitter based on the detection results of the temperature sensors and thermal expansion coefficients of the robot arm, and the belt and the pulleys.

While the example in which the temperature sensors are thermocouples arranged on interior surfaces of the robot arm has been shown in the aforementioned embodiment, the present disclosure is not limited to this. The temperature sensors may be arranged on surfaces other than the inner surfaces of the robot arm, or may be temperature sensors other than thermocouples. For example, the temperature sensors may be temperature sensors provided to encoders of electric motors of the drive mechanisms.

While the example in which the robot arm and the gears are formed of materials having different thermal expansion coefficients, and the controller compensates for the influence of a thermal expansion of the backlash between the gears based on the detection result of the temperature sensor and a difference between the thermal expansion coefficients of the robot arm and the gears has been shown in the aforementioned embodiment, the present disclosure is not limited to this. The robot arm and the gears may be formed of materials having the same thermal expansion coefficient. Even in this case, if heat distributions of the robot arm and the gears are different from each other, thermal expansion amounts of the robot arm and the gears become different from each other so that an angular error discussed above may occur. In this case, temperatures of the robot arm and the gears are detected so that the controller can compensate for an influence of a thermal expansion of a backlash between the gears based on the temperature of the robot arm and the temperatures of the gears, the thermal expansion coefficient of the robot arm and the thermal expansion coefficient of the gears.

While the example in which the robot arm is formed of aluminum, and the gears are formed of steel has been shown in the aforementioned embodiment, the present disclosure is not limited to this. The robot arm and gear may be formed of any material.

While the example in which the gears include an output gear and a plurality of input gears has been shown in the aforementioned embodiment, the present disclosure is not limited to this. The gears may include an output gear and one input gear.

While the example in which the controller compensates for the influence of the thermal expansion of the backlash between the output gear and the input gear that is closest to the output gear side in the plurality of input gears has been shown in the aforementioned embodiment, the present disclosure is not limited to this. The controller may compensate not only for the influence of a thermal expansion of the backlash between the output gear and the input gear but also for an influence of a thermal expansion of a backlash the input gears.

Functions of elements disclosed in this specification can be realized by a circuit or processing circuit including a general purpose processor, a dedicated processor, an integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

DESCRIPTION OF REFERENCE NUMERALS

10; robot arm
20; substrate-holding hand
30; controller
40; drive mechanism
43; power transmitter
44; shaft
50; temperature sensor
100; robot
200; clean room 431; gear
431a; output gear
431b, 431c; input gear
441; rotation shaft
442; bearing

The invention claimed is:

1. A robot comprising:
   a robot arm;
   a drive mechanism for driving the robot arm, the drive mechanism including one or more gears and a shaft;
   a temperature sensor for detecting a temperature in the robot arm; and
   a controller for compensating for influences of thermal expansions of the robot arm and the shaft based on a detection result of the temperature sensor, wherein
   the controller compensates for an influence of the thermal expansion on reduction in torsional rigidity of the shaft based on the detection result of the temperature sensor and an operating torque of the drive mechanism.

2. The robot according to claim 1, wherein the controller compensates for a deviation amount of rotation of the robot arm caused by at least one of a change in a backlash between gears of the one or more gears due to the thermal expansion and the reduction of torsional rigidity of the shaft due to the thermal expansion.

3. The robot according to claim 1, wherein the controller compensates for the influence of a thermal expansion of a backlash between gears of the one or more gears based on the detection result of the temperature sensor and thermal expansion coefficients of the robot arm and the gears of the one or more gears.

4. The robot according to claim 3, wherein
   the robot arm and the gears of the one or more gears comprise materials having different thermal expansion coefficients; and
   the controller compensates for the influence of a thermal expansion of the backlash between the gears of the one or more gears based on the detection result of the temperature sensor and one or more differences between the thermal expansion coefficients of the robot arm and the gears of the one or more gears.

5. The robot according to claim 1, wherein
   gears of the one or more gears include an output gear and a plurality of input gears; and
   the controller compensates for the influence of a thermal expansion of a backlash between the output gear and the input gear that is closest to an output gear side in the plurality of input gears.

6. The robot according to claim 1 further comprising a substrate-holding hand arranged in a distal end part of the robot arm.

7. The robot according to claim 1, wherein the robot is arranged in a clean room.

8. The robot according to claim 1, wherein the robot is arranged in a vacuum environment.

9. The robot according to claim 1, wherein the shaft includes a rotation shaft, and a bearing into which the rotation shaft is inserted.

10. A robot comprising:
    a robot arm;
    a drive mechanism for driving the robot arm, the drive mechanism including a power transmitter and a shaft;
    a temperature sensor for detecting a temperature in the robot arm; and
    a controller for compensating for influences of thermal expansions of the robot arm and the shaft based on a detection result of the temperature sensor, wherein the controller compensates for an influence of the thermal expansion on reduction in torsional rigidity of the shaft based on the detection result of the temperature sensor and an operating torque of the drive mechanism.

11. A method for controlling a robot comprising:

driving a robot arm by using a drive mechanism including one or more gears and a shaft;

detecting a temperature in the robot arm by using a temperature sensor;

compensating for influences of thermal expansions of the robot arm and the shaft based on a detection result of the temperature sensor; and compensating for an influence of the thermal expansion on reduction in torsional rigidity of the shaft based on the detection result of the temperature sensor and an operating torque of the drive mechanism.

12. The method for controlling the robot according to claim 11, wherein the compensating for the influence of the thermal expansion includes compensating for a deviation amount of rotation of the robot arm caused by at least one of a change in a backlash between gears of the one or more gears due to the thermal expansion and the reduction of torsional rigidity of the shaft due to the thermal expansion.

* * * * *